US007933551B2

(12) United States Patent
Shibouta

(10) Patent No.: US 7,933,551 B2
(45) Date of Patent: Apr. 26, 2011

(54) MOBILE COMMUNICATION SYSTEM AND MOBILE COMMUNICATION METHOD

(75) Inventor: Hideto Shibouta, Tokyo (JP)

(73) Assignee: NEC Corporation, Tokyo (JP)

( * ) Notice: Subject to any disclaimer, the term of this patent is extended or adjusted under 35 U.S.C. 154(b) by 110 days.

(21) Appl. No.: 10/938,819

(22) Filed: Sep. 13, 2004

(65) Prior Publication Data

US 2005/0064863 A1    Mar. 24, 2005

(30) Foreign Application Priority Data

Sep. 18, 2003    (JP) .................................. 2003-326097

(51) Int. Cl.
*H04B 7/15*    (2006.01)
(52) U.S. Cl. ............ 455/11.1; 455/7; 455/13.1; 455/16; 370/315
(58) Field of Classification Search ............... 455/422.1, 455/446, 546, 422, 41.2, 13.1, 16, 7, 8, 9, 455/10, 11.1, 12.1, 13.2, 13.3; 370/315
See application file for complete search history.

(56) References Cited

U.S. PATENT DOCUMENTS

| | | | | |
|---|---|---|---|---|
| 6,473,617 | B1 * | 10/2002 | Larsen et al. | 455/446 |
| 7,117,002 | B2 * | 10/2006 | Kanazawa et al. | 455/519 |
| 2001/0036810 | A1 * | 11/2001 | Larsen | 455/11.1 |
| 2002/0197969 | A1 * | 12/2002 | Moon et al. | 455/211 |
| 2003/0048763 | A1 * | 3/2003 | Kondo | 370/331 |
| 2003/0203716 | A1 * | 10/2003 | Takahashi et al. | 455/11.1 |
| 2004/0114545 | A1 * | 6/2004 | Edwards | 370/294 |
| 2004/0208183 | A1 * | 10/2004 | Balachandran et al. | 370/395.21 |

FOREIGN PATENT DOCUMENTS

| | | | |
|---|---|---|---|
| CN | 1279541 | A | 10/2001 |
| GB | 2326059 | * | 12/1998 |
| GB | 2326059 | A | 12/1998 |
| JP | 11308665 | A | 11/1999 |
| JP | 2005513931 | A | 5/2005 |
| WO | WO 00/54539 | * | 9/2000 |
| WO | WO 00/54539 | A1 | 9/2000 |
| WO | 03055246 | A1 | 7/2003 |

OTHER PUBLICATIONS

Wu, H. et al.: "Integrated Cellular and Ad Hoc Relaying Systems: iCAR"; IEEE Journal on Selected Areas in Communications, IEEE Inc., New York, US; vol. 19, No. 10, Oct. 2001, pp. 2105-2115.

* cited by examiner

*Primary Examiner* — Patrick N Edouard
*Assistant Examiner* — Fred A Casca
(74) *Attorney, Agent, or Firm* — Sughrue Mion, PLLC

(57) ABSTRACT

When a wireless base station temporarily runs short of communication resources, the base station searches for a portable telephone having a relay function of mobile communication. Based on a demand of the wireless base station, the portable telephone having the relay function relays communication of a portable telephone within a communication area of the base station on behalf of the base station. This portable telephone can communicate with an adjacent wireless base station and can communicate with a receiving portable telephone and another portable telephone having the relay function.

17 Claims, 4 Drawing Sheets

MOBILE COMMUNICATION SYSTEM AND MOBILE COMMUNICATION METHOD

BACKGROUND OF THE INVENTION

1. Field of the Invention

The present invention relates to a mobile communication system and a mobile communication method, more particularly to a technology which enables communication of a mobile station within a communication area (CELL) even if a wireless base station runs short of communication resources.

2. Description of the Related Art

If a number of users of portable telephones simultaneously start their communications within a small area, a wireless base station of the area may temporarily run short of communication resources. For example, in an occasion when a number of people gather in a narrow area, such as a music concert or the like, if a number of portable telephones simultaneously demand for calls, the calls cannot be made temporarily. In order to deal with such a shortage of communication resources of the wireless base station, a W-CDMA system has recently started to be adopted in a mobile communication system. However, it is not practical to change a method of the mobile communication system in order to deal with a temporary shortage of communication resources of the wireless base station in a special case as described above.

There has been disclosed a technology capable of dealing with the above-described shortage of communication resources of the wireless base station. Japanese Patent Laid-Open No. 2000-82989 discloses a mobile station capable of operating in a base station mode. This mobile station can dynamically construct a local area network when there is no base station. In Japanese Patent Laid-Open No. 2001-268636, when a mobile station in a predetermined area receives a control signal, the mobile station stops communication with a base station. As another related technology, in Japanese Patent Laid-Open No. 2003-61136, when a first mobile station cannot access a wireless base station, the first mobile station detects a nearby second mobile station and transmits information thereto. The second mobile station transmits the information to the base station.

SUMMARY OF THE INVENTION

A mobile communication system of the present invention includes a wireless base station and a mobile station. The wireless base station transmits information to a predetermined mobile station. The mobile station receiving the information forms a communication path via the mobile station as a communication path when another adjacent mobile station performs communication. A mobile communication method of the present invention includes the following steps. Specifically, when a communication throughput between a wireless base station and a mobile station within a communication area of the wireless base station approaches its limit, the wireless base station transmits information to a mobile station having a relay function. When a mobile station adjacent to the mobile station having the relay function performs communication, a communication path via the mobile station having the relay function is formed. A communication method of a mobile station having a communication relay function includes the following steps. Specifically, (1) information is received from a wireless base station and (2) when a call from an adjacent mobile station is detected, communication between the adjacent mobile station and any one of (a) a wireless base station which is located around the wireless base station and has plenty of communication resources, (b) a mobile station with which the adjacent mobile station communicates and (c) another mobile station having the communication relay function is relayed based on the information.

In the invention described above, even if the wireless base station temporarily runs short of communication resources, a call from a portable telephone (that is, a mobile station) can be smoothly made.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
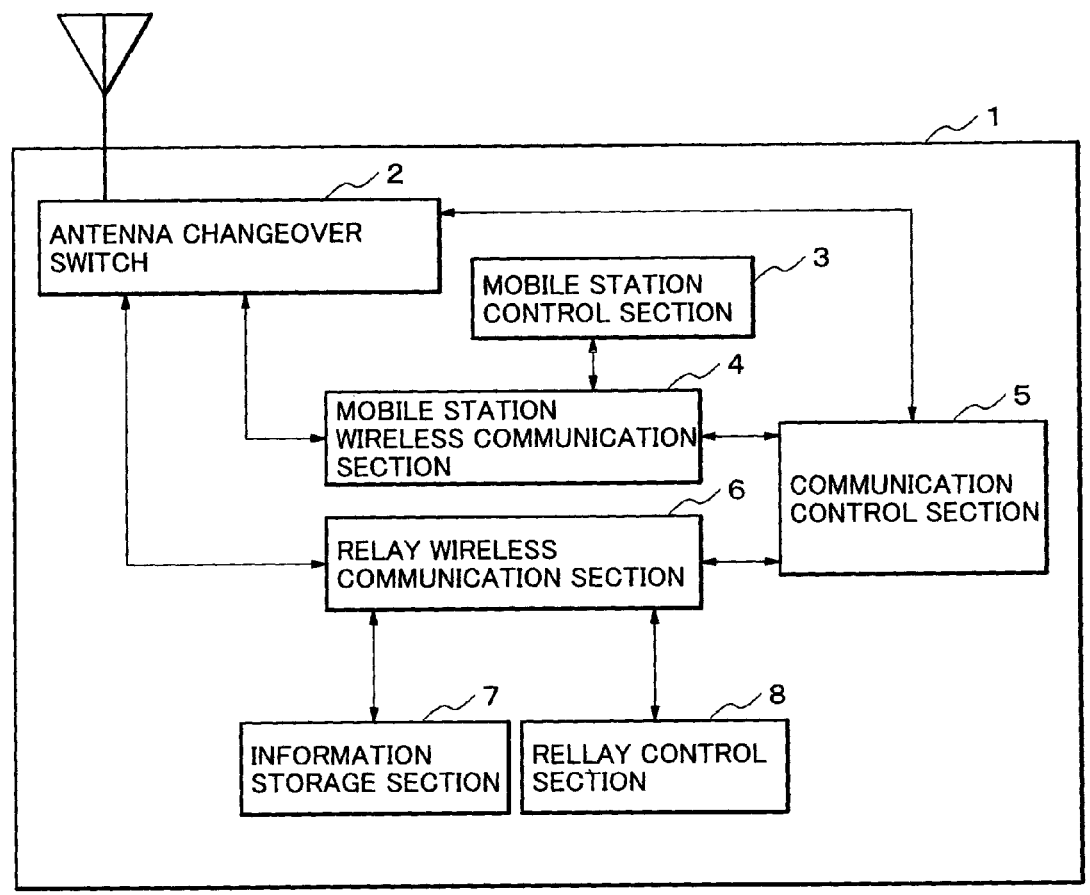
FIG. 1 is a block diagram of an embodiment of a mobile station having a relay function of mobile communication.

The preferred embodiments of the present invention will be described below. FIG. 1 shows an embodiment of a portable telephone as a mobile station which has a relay function of mobile communication. A portable telephone 1 has an antenna changeover switch 2 and a communication control section 5 which controls the switch 2. The portable telephone 1 includes a mobile station wireless section 4 and a relay wireless section 6. The mobile station wireless communication section 4 is used when the portable telephone 1 performs communication via a base station. The relay wireless communication section 6 is used when the portable telephone 1 relays communication of another portable telephone. The relay wireless communication section 6 can relay communication of another portable telephone located within about several ten meters from the portable telephone 1. A mobile station control section 3 controls the mobile station wireless communication section 4. A relay control section 8 controls the relay wireless communication section 6. The communication control section 5 executes a basic communication control of the portable telephone 1. A base station information storage section 7 stores information received from the base station by the portable telephone 1. The information includes, for example: information about a mobile station which is located within a communication area (CELL) of the base station and has difficulty in communicating with the base station; information about a base station which is located around the base station and has plenty of communication resources; and the like.

Figure 2:
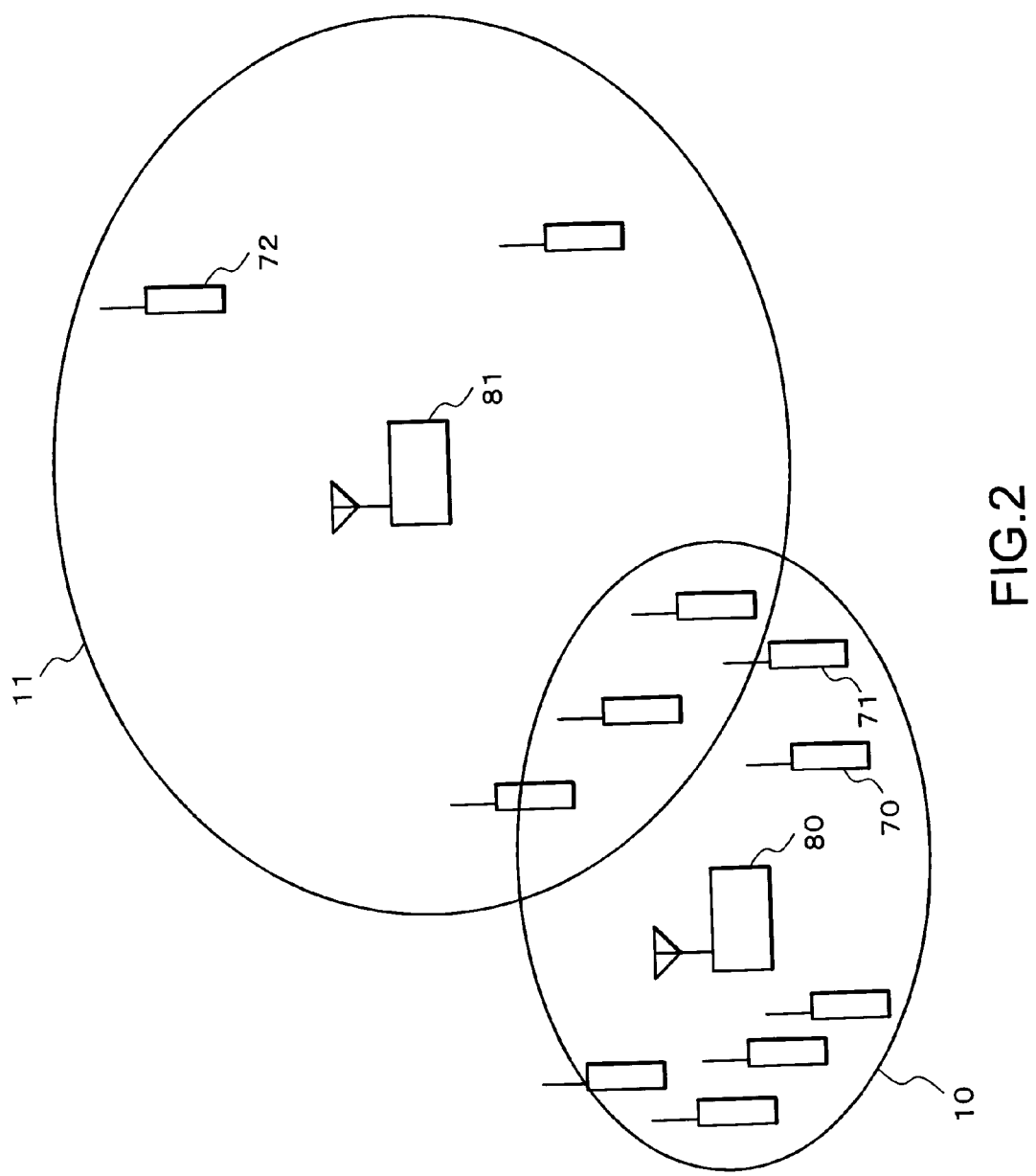
FIG. 2 shows an example of a mobile communication system.

With reference to FIG. 2, a mobile communication system of an embodiment includes a wireless base station 80 and a communication area (CELL) 10 thereof, as well as an adjacent wireless base station 81 and a communication area (CELL) 11 thereof. A portable telephone within the communication area 10 performs communication via the wireless base station 80. Moreover, a portable telephone within the communication area 11 performs communication via the wireless base station 81. The wireless base stations 80 and 81 exchange information about communication resources with each other and grasp each other's situations. As shown in FIG. 2, if a number of portable telephones are located within the communication area 10 and communications are started all at once, the wireless base station 80 runs short of communication resources. In this event, the wireless base station 80 creates a new mobile communication path via a portable telephone 70 having a function of relaying mobile communication and the wireless base station 81. First, the wireless base station 80 searches for a portable telephone having a function of relaying mobile communication within the communication area 10. When the wireless base station 80 detects the appropriate portable telephone 70, the wireless base station 80 transmits predetermined information to the portable telephone 70. The information includes, for example: (a) a control signal for starting the function of relaying mobile communication, the function being possessed by the portable telephone 70; (b) information about the adjacent wireless base station 81 which has plenty of communication resources; and (c) information about a portable telephone (for example, a portable telephone 71 in FIG. 2) which is located in the communication area 10 and has difficulty in communicating with the wireless base station 80. When the portable telephone 70 receives the information described above, the communication control section 5 shifts the antenna changeover switch 2 to start the relay wireless section 6. Subsequently, the portable telephone 70 finds the portable telephone 71. When the portable telephone 71 demands for a call, the portable telephone 70 creates a new mobile communication path via the wireless base station 81.

Figure 3:
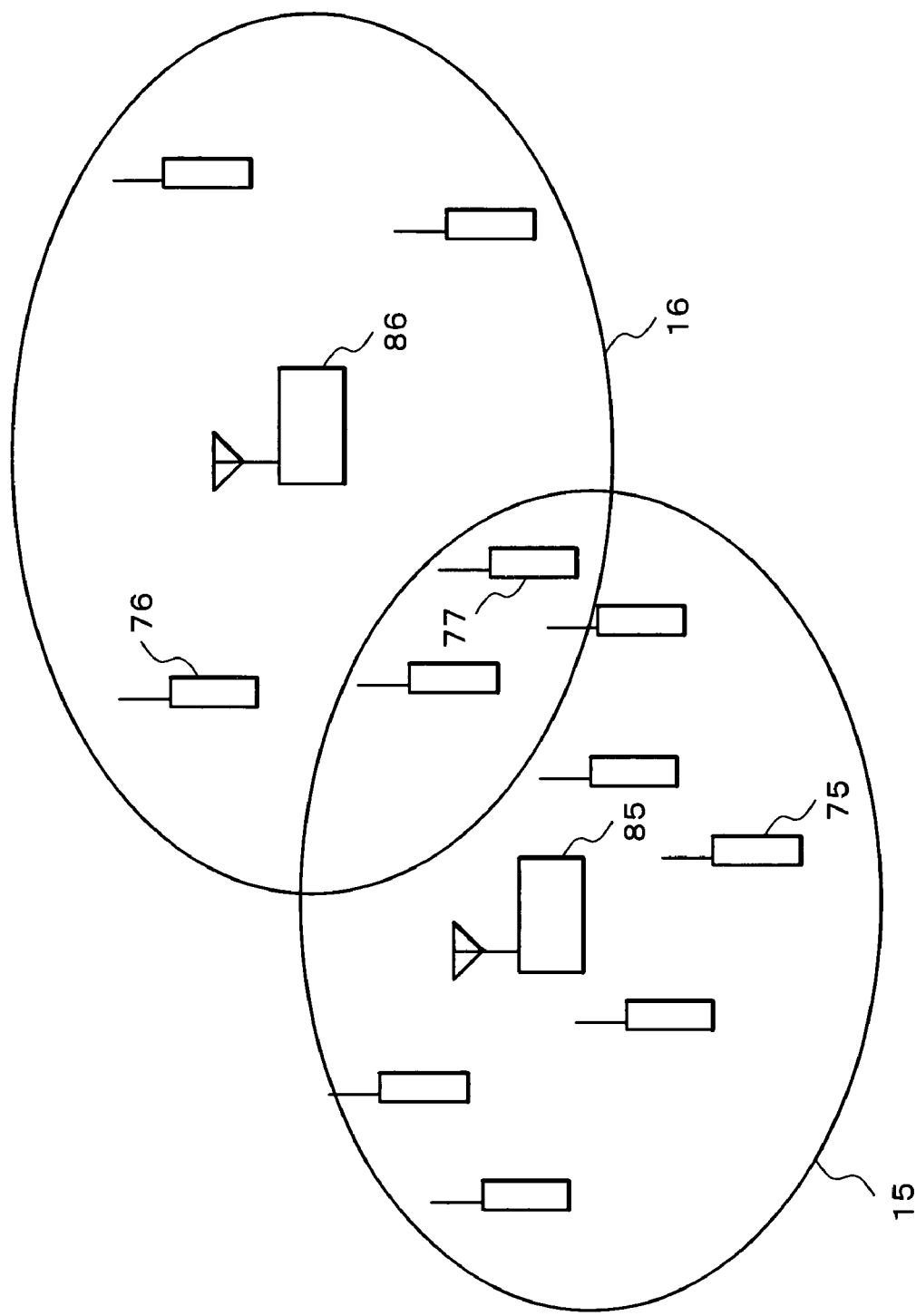
FIG. 3 shows another example of the mobile communication system.

FIG. 3 shows another embodiment of the mobile communication system of the present invention. In the system of this embodiment, a wireless base station 85 and a communication area (CELL) 15 thereof, as well as an adjacent wireless base station 86 and a communication area (CELL) 16 thereof exist. A portable telephone (that is, a mobile station) within the communication area 15 performs communication via the wireless base station 85. Moreover, a portable telephone within the communication area 16 performs communication via the wireless base station 86. In this embodiment, a portable telephone 77 is located in the communication areas 15 and 16 at the same time. The wireless base stations 85 and 86 exchange information about communication resources with each other and grasp each other's situations.

Figure 4:
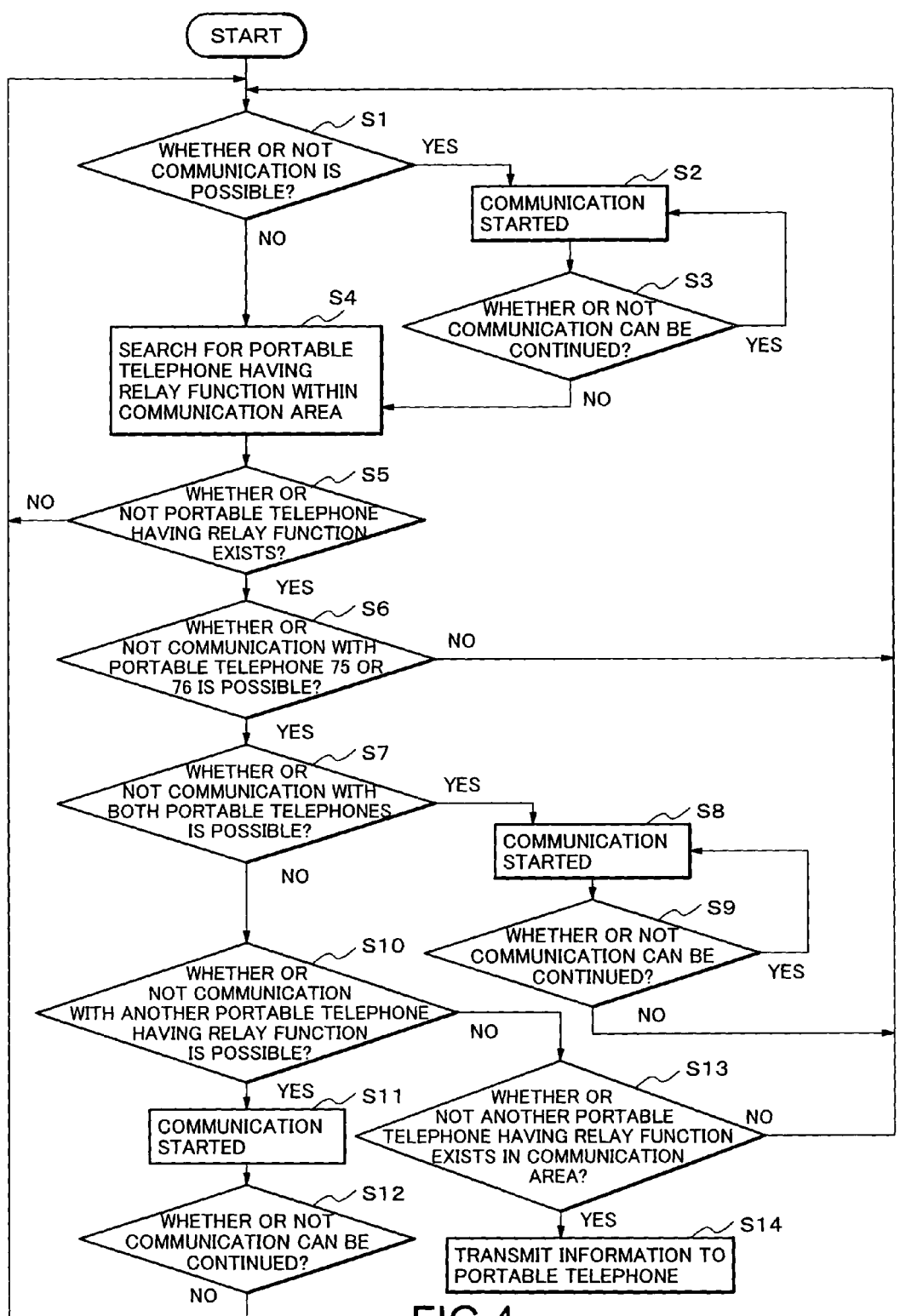
FIG. 4 is a flowchart of operations of the mobile communication system shown in FIG. 3.

FIG. 4 shows an operation example of the mobile communication system shown in FIG. 3. Portable telephones 75 and 76 communicate with each other via the wireless base stations 85 and 86 (S1 and S2). The wireless base station 85 now runs short of communication resources and communication between the portable telephone 75 and the wireless base station 85 becomes difficult (No in S3). In this event, the wireless base station 85 searches for a portable telephone which is located in the communication area 15 and has a function of relaying mobile communication (S4). When the wireless base station 85 cannot process a demand for communication to, for example, the portable telephone 76 from the portable telephone 75 (No in S1), the wireless base station 85 similarly executes the search operation described above (S4). When the wireless base station 85 finds the portable telephone having the relay function described above (the portable telephone 77 in this embodiment) (Yes in S5), the wireless base station 85 transmits predetermined information to the portable telephone 77. According to this information, the portable telephone 77 determines whether or not it is possible to communicate with the portable telephone 75 and/or the portable telephone 76 (S6 and S7). When the portable telephone 77 can communicate with the both portable telephones 75 and 76 (Yes in S7), the portable telephone 77 directly relays communication between the portable telephones 75 and 76 (S8 and S9). When the portable telephone 77 can communicate only with the portable telephone 75 (No in S7), the portable telephone 77 searches for a portable telephone which has a relay function of mobile communication and can communicate with the portable telephone 76 (S10). The portable telephone 77 can execute this search operation based on the communication control section 5, the relay control section 8 and the foregoing information stored in the base station information storage section 7. When the portable telephone 77 finds the portable telephone which meets the foregoing conditions (Yes in S10), the communication between the portable telephones 75 and 76 is started via two portable telephones, each having the relay function (S11 and S12). In the case of No in S7, even if the portable telephone 77 can communicate only with the portable telephone 76, an operation similar to that described above is executed. When the portable telephone 77 cannot find the portable telephone having the relay function (No in S10), the portable telephone 77 informs the wireless base station 85 of the result. The wireless base station 85 searches for another portable telephone, which is a portable telephone having the relay function and serves as a replacement for the portable telephone 77, within the communication area 15 (S13). The wireless base station 85 transmits information to the new portable telephone (S14).

In the embodiment described above, when the portable telephone 75 cannot communicate with the portable telephone 77, the portable telephone 75 can automatically start accessing the wireless base station 85 again. In the case of searching for the portable telephone having the relay function of mobile communication, the wireless base station 85 can search for the portable telephone with the relay function which is located near the communication area 16 or within the communication area 16. When a company operating mobile communication utilizes a portable telephone having the relay function in order to relay the mobile communication described above, the owner of the portable telephone can receive a predetermined usage fee from the company.

In the invention described above, even if calls are made simultaneously from a number of portable telephones, smooth communication can be performed.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A mobile communication system comprising:
   a wireless base station; and
   a plurality of mobile stations, including a predetermined mobile station, a first mobile station and a second mobile station,
   wherein the wireless base station transmits information to the predetermined mobile station, which includes a relay circuit that relays a signal between the first mobile station and the second mobile station,
   the information transmitted from the wireless base station includes an instruction that makes the relay circuit of the predetermined mobile station start relaying, and
   in response to receiving the instruction that makes the relay circuit start relaying, the predetermined mobile station forms a communication path between the first mobile station and the second mobile station, in the communication path the predetermined mobile station relays the signal between the first mobile station and the second mobile station, and the predetermined mobile station notifies the wireless base station, when the communication path is unable to be formed, the first mobile station is spatially separated from the predetermined mobile station, the second mobile station is spatially separated from the predetermined mobile station and from the first communication station, the first mobile station is at an end of the communication path and the second mobile station is at another end of the communication path, the communication path bypasses the wireless base station, and the wireless base station determines whether a communication throughput between the wireless base station and a mobile station within a communication area of the wireless base station exceeds a throughput limit, and the wireless base station transmits the signal that starts the relay circuit of the predetermined mobile station if the communication throughput is determined to exceed the throughput limit.

2. The mobile communication system according to claim 1, wherein the communication path formed by the predetermined mobile station between the first and second mobile stations comprises at least one other mobile station that includes a relay circuit that relays signals between the predetermined mobile station and another mobile station among the plurality of mobile stations.

3. The mobile communication system according to claim 1, wherein the first and second mobile stations are within a communication area of the wireless base station.

4. The mobile communication system according to claim 2, wherein when connection with the second mobile station cannot be made, the predetermined mobile station searches for another mobile station including a relay circuit that relays signals between the predetermined mobile station and another mobile station among the plurality of mobile stations.

5. The mobile communication system according to claim 1, wherein the information includes information about a mobile station among the plurality of mobile stations which is located within a communication area of the wireless base station and has difficulty in communicating with the base station.

6. The mobile communication system according to claim 5, wherein the first mobile station is a mobile station which has difficulty in communicating with the wireless base station after communication with the base station is started.

7. The mobile communication system according to claim 1, wherein the first mobile station does not include a relay circuit that relays signals.

8. The mobile communication system according to claim 1, wherein the second other mobile station does not include a relay circuit that relays signals.

9. The mobile communication system according to claim 1, wherein the second mobile station is outside the communication are of the wireless base station.

10. The mobile communication system according to claim 1, wherein the wireless base station transmits the information including the signal to start the relay circuit to the predetermined mobile station when the wireless base station cannot process a demand for communication received from the first mobile station.

11. The mobile communication system according to claim 1, wherein the communication path formed by the predetermined mobile station is a direct path between the first mobile station and the second mobile station having only the predetermined mobile station there-between.

12. A mobile communication method in a mobile communication system including a wireless base station and a plurality of mobile stations, including mobile station, a first mobile station and a second mobile station, the method comprising:

transmitting, from the wireless base station, information to the predetermined mobile station, which includes a relay circuit that relays a signal between the first mobile station and the second mobile station, wherein the information transmitted from the wireless base station includes an instruction that makes the relay circuit of the predetermined mobile station start relaying, forming, by the predetermined mobile station, a communication path between the first mobile station and second mobile station in the communication path the predetermined mobile station relays the signal transmitted between the first mobile station and second mobile station, in response to receiving the instruction that makes the relay circuit start relaying, the predetermined mobile station notifies the wireless base station when the communication path is unable to be formed, the first mobile station is spatially separated from the predetermined mobile station, the second mobile station is spatially separated from the predetermined mobile station and from the first communication station, the first mobile station is at an end of the communication path and the second mobile station is at another end of the communication path, and the communication path bypasses the wireless base station, and determining, by the wireless base station, whether a communication throughput between the wireless base station and a mobile station within a communication area of the wireless base station exceeds a throughput limit, and the wireless base station transmits the signal that starts the relay circuit of the predetermined mobile station if the communication throughput is determined to exceed the throughput limit.

13. The mobile communication method according to claim 12, wherein the communication path formed by the predetermined mobile station between the first and second mobile stations comprises at least one other mobile station that includes a relay circuit that relays signals between the predetermined mobile station and another mobile station among the plurality of mobile stations.

14. The mobile communication method according to claim 12, wherein the communication path formed by the predetermined mobile station is a direct path between the first mobile station and the second mobile station having only the predetermined mobile station there-between.

15. A mobile communication system comprising:
a first wireless base station; and
a plurality of mobile stations, including a predetermined mobile station and a first mobile station,
wherein the first wireless base station transmits information to a the predetermined mobile station, which includes a relay circuit that relays a signal between the first mobile station and a second wireless base station,
the information transmitted from the first wireless base station includes an instruction that makes the relay circuit of the predetermined mobile station start relaying, and in response to receiving the instruction that makes the relay circuit start relaying, the predetermined mobile station forms a communication path between the first mobile station and the second wireless base station, in the communication path the predetermined mobile station relays the signal between the first mobile station and the second wireless base station, the predetermined mobile station notifies the first wireless base station, when the communication path is unable to be formed, the first mobile station is spatially separated from the predetermined mobile station, the first mobile station is at an end of the communication path and the second wireless base station is at another end of the communication path, the communication path bypasses the first wireless base station, and the first wireless base station transmits the instruction that makes the relay circuit of the predetermined mobile station start relaying when the first wireless base station determines that the communication throughput between the first wireless base station and the first mobile station exceeds a throughput limit and thus cannot process a demand for communication received from the first mobile station.

16. The mobile communication system according to claim 15,
wherein the information transmitted by the first wireless base station further includes information about the second wireless base station which is adjacent to the first wireless base station and has available communication throughput to communicate with the first mobile station.

17. The mobile communication system according to claim 15, wherein the communication path formed by the predetermined mobile station is a direct path between the first mobile station and the second wireless base station having only the predetermined mobile station there-between.

* * * * *